(12) United States Patent
Erhart

(10) Patent No.: US 9,651,428 B2
(45) Date of Patent: May 16, 2017

(54) BATTERY SYSTEM TEMPERATURE MONITOR

(71) Applicant: Samsung SDI Co., Ltd., Yongin-si, Gyeonggi-do (KR)

(72) Inventor: Michael Erhart, Hart bei Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 534 days.

(21) Appl. No.: 14/085,824

(22) Filed: Nov. 21, 2013

(65) Prior Publication Data

US 2014/0140369 A1 May 22, 2014

(30) Foreign Application Priority Data

Nov. 22, 2012 (EP) .................... 12193807

(51) Int. Cl.
| | |
|---|---|
| *H02J 7/00* | (2006.01) |
| *G01J 5/00* | (2006.01) |
| *G01K 1/16* | (2006.01) |
| *G01K 13/00* | (2006.01) |
| *G01K 13/10* | (2006.01) |
| *G01J 5/02* | (2006.01) |
| *H01M 2/34* | (2006.01) |
| *H01M 10/48* | (2006.01) |
| *H01M 10/42* | (2006.01) |

(52) U.S. Cl.
CPC ............ *G01J 5/028* (2013.01); *H01M 2/348* (2013.01); *H01M 10/482* (2013.01); *H01M 10/486* (2013.01); *H01M 2010/4271* (2013.01); *H01M 2200/10* (2013.01)

(58) Field of Classification Search
CPC ...... G01J 5/00; G01J 5/12; H02J 7/00; G01K 1/16; G01K 13/00; G01K 13/10
USPC .................................................. 702/130, 135
See application file for complete search history.

(56) References Cited

U.S. PATENT DOCUMENTS

| | | | | |
|---|---|---|---|---|
| 5,483,068 A | * | 1/1996 | Moulton ............... | G01J 5/0003 250/334 |
| 5,700,089 A | * | 12/1997 | McKinnon ......... | G01R 31/3606 374/121 |
| 6,267,500 B1 | * | 7/2001 | Hollander ............... | G01J 5/02 250/491.1 |
| 6,469,511 B1 | * | 10/2002 | Vonderhaar ....... | H01M 10/4257 320/147 |
| 6,508,584 B2 | * | 1/2003 | Blankenagel ......... | G01K 15/00 320/150 |
| 6,531,847 B1 | | 3/2003 | Tsukamoto | |

(Continued)

FOREIGN PATENT DOCUMENTS

| | | |
|---|---|---|
| CN | 203323887 U * | 12/2013 |
| DE | 10 2005 058315 A1 | 6/2007 |

(Continued)

*Primary Examiner* — Gail Kaplan Verbitsky

(74) *Attorney, Agent, or Firm* — Lewis Roca Rothgerber Christie LLP

(57) ABSTRACT

A battery system including a plurality of battery cells and at least one electronic unit having a circuit board and a temperature measuring device with at least two infrared temperature sensors arranged on and operatively connected to the circuit board and configured to measure a temperature of a predetermined measurement region on a surface of the battery cells.

18 Claims, 5 Drawing Sheets

(56) References Cited

U.S. PATENT DOCUMENTS

| | | | | |
|---|---|---|---|---|
| 6,777,910 B2* | 8/2004 | Small | H01M 2/1055 | 320/106 |
| 6,919,725 B2* | 7/2005 | Bertness | H02J 7/0091 | 320/150 |
| 6,984,065 B2* | 1/2006 | Roepke | H01M 10/486 | 320/150 |
| 7,828,478 B2* | 11/2010 | Rege | G01J 5/0022 | 250/338.1 |
| 8,159,341 B2* | 4/2012 | Waugh | G08B 21/12 | 340/539.26 |
| 8,794,827 B2* | 8/2014 | Ishikawa | G01K 1/08 | 374/141 |
| 9,182,286 B2* | 11/2015 | Nakamura | G01J 1/04 | |
| 2005/0099163 A1* | 5/2005 | Liepold | G01K 17/06 | 320/150 |
| 2008/0272742 A1* | 11/2008 | Hart | H01M 10/443 | 320/150 |
| 2008/0285193 A1* | 11/2008 | Watanabe | H01M 10/482 | 361/88 |
| 2010/0202490 A1* | 8/2010 | Ishikawa | G01K 1/14 | 374/165 |
| 2011/0187377 A1* | 8/2011 | Boysen | G01R 31/36 | 324/426 |
| 2012/0029724 A1* | 2/2012 | Formanski | H01M 10/443 | 700/300 |
| 2013/0202009 A1* | 8/2013 | Murugan | G01J 5/0896 | 374/121 |
| 2015/0380957 A1* | 12/2015 | Ghantous | H02J 7/0052 | 320/134 |
| 2016/0013523 A1* | 1/2016 | Anzicek | H01M 10/486 | 429/61 |
| 2016/0087461 A1* | 3/2016 | Greening | H02J 7/007 | 320/107 |
| 2016/0178593 A1* | 6/2016 | Miller | G06K 9/00791 | 382/191 |

FOREIGN PATENT DOCUMENTS

| | | | | |
|---|---|---|---|---|
| EP | 0 473 514 A2 | 3/1992 | | |
| EP | 1 667 307 A1 | 6/2006 | | |
| JP | 01307650 A | * 12/1989 | | |
| JP | 03061892 A | * 3/1991 | | |
| JP | WO 2012132342 A1 | * 10/2012 | | G01J 5/0875 |
| KR | 2008053026 A | * 6/2008 | | |
| WO | WO 2005/114811 A2 | 12/2005 | | |

\* cited by examiner

BATTERY SYSTEM TEMPERATURE MONITOR

CROSS-REFERENCE TO RELATED APPLICATIONS

The present application claims priority 35 U.S.C. §119 to European Patent Publication No. EP 12193807.0 (filed on Nov. 22, 2012), which is hereby incorporated by reference in its entirety.

TECHNICAL FIELD

Embodiments relate to a battery system having an electronic unit with a temperature measuring device, and a battery system comprising a plurality of battery cells and at least one electronic unit having a temperature measuring device.

BACKGROUND

The temperature of battery cells in a battery system has a great influence on the power output, on the operational reliability and the operational life of a battery. It is possible by ascertaining the temperature of individual battery cells to counteract with the aid of cooling/heating devices any events where an upper and lower desired limit value of the temperature for the operation of the battery cells is exceeded or not achieved.

In order to ascertain reliable temperature measured values, it is necessary to measure the temperature of the battery cells at particular time intervals, wherein in order to obtain reliable measured data the temperature of the battery cells is always to be ascertained at the same predetermined positions.

Diodes, for example, may be used as sensor elements that are suitable for monitoring the temperature of battery cells. Alternatively, it is also possible to use transistors that are connected as diodes. The sensor elements are mainly embodied as NTC resistors or PTC resistors.

When using the abovementioned types of sensors, problems frequently occur with transferring heat between the battery cells and the sensor elements.

German Patent Publication No. DE 10 2005 058 315 A1 discloses a measuring method that uses an infrared sensor or a thermal imaging camera to sense and ascertain the battery or accumulator surface locally at different measuring points that are spaced apart. The infrared sensor may be moved along different scan paths and/or scan curves relative to the battery or accumulator surface being measured, or individual measuring points may be selected electronically from a thermal image in accordance with a predetermined pattern. The greater the number of measuring points and the more complex the scan paths and/or measuring point pattern, the more accurate are the conclusions relating to the temperature distribution and the more accurate are the conclusions relating to the battery or accumulator condition.

The infrared sensor disclosed in DE 10 2005 058 315 A1 may be embodied, for example, as a thermal imaging camera that records the temperature distribution over the entire battery surface in one measuring step. Selected measuring points are then used for evaluation purposes. Alternatively, the battery or accumulator surface may also be scanned using a spot-measuring infrared sensor, in that either the infrared sensor or the substrate of the battery measuring place is motorized and as a consequence is moveable so that it is possible by way of the motorized arrangement to move along different scan paths. Furthermore, multiple passes through the measuring point raster are possible in one scanning process in order to be able to better filter out deviations in the statistical measured values of an individual measurement or to be able at least to compensate for such deviations by way of forming an average.

The devices and method disclosed in DE 10 2005 058 315 A1 are suitable for performing tests on test benches and in laboratories. Due to the installation position and the constricted space conditions for example in a motor vehicle, the temperature of a plurality of battery cells of a battery module or of a battery system may only be monitored in a reliable non-contact manner in the manner described in the prior art with a high technical outlay and high costs.

SUMMARY

Embodiments relate to enhanced temperature measuring devices for the electronic unit of a battery system.

Embodiments relate to a battery system having an electronic unit that operates in a non-contact manner and which includes a temperature measuring device that is simple to produce and is allocated permanently to a battery module of the battery system.

Embodiments relate to a temperature measuring device that renders it possible to perform a continuous and reliable measurement of the temperature of a plurality of battery cells of a battery system of a motor vehicle during its operation.

Embodiments relate to one or more battery systems that have increased operational reliability.

In accordance with embodiments, a battery system includes at least one of: a housing; at least one electronic unit; a temperature measuring device; a plurality of battery cells, wherein at least two infrared temperature sensors are arranged on a circuit board of the electronic unit having the temperature measuring device and are operatively connected to the circuit board of the electronic unit having the temperature measuring device, wherein the infrared temperature sensors are arranged and configured in such a manner that the temperature in each case of a predetermined measurement region on a surface of the battery system may be sensed by way in each case of an infrared temperature sensor. The predetermined measurement regions are arranged on and/or over the surface of the battery system are advantageously spaced apart from one another in such a manner that they do not spatially overlap each other or only spatially overlap each other in a small way.

In accordance with embodiments, a battery system includes at least one of: a plurality of battery cells; and at least one electronic unit having a circuit board and a temperature measuring device with at least two infrared temperature sensors arranged on and operatively connected to the circuit board and configured to sense a temperature of a predetermined measurement region on a surface of the battery system.

In accordance with embodiments, a battery system for a motor vehicle includes at least one of: a plurality of battery cells; an electronic unit having a circuit board; and temperature sensors operatively connected to the circuit board and configured to measure a temperature of a predetermined measurement region on a surface of the battery cells.

In accordance with embodiments, a battery system for a motor vehicle includes at least one of: a plurality of battery cells; an electronic unit having a circuit board; and a temperature sensor operatively connected to the circuit board and configured to measure a temperature of a predetermined measurement region on a surface of the battery cells, wherein the temperature sensor has an effective measurement field that simultaneously measures the temperature of adjacent battery cells.

The advantage of the electronic unit having a temperature measuring device resides in the fact that by using a plurality of infrared temperature sensors, the temperature of partial regions of a battery system, in particular, of individual battery cells and also of partial regions of individual battery cells may be monitored simultaneously and continuously. Due to the fact that the surface temperature is measured in a non-contact manner using infrared radiation, it is possible to mechanically decouple the heavy battery cells from the sensitive sensor elements.

The accurate and precise arrangement of the infrared temperature sensors by way of example on and/or over a circuit board of an electronic unit having a temperature measuring device produces a simple assembly of both the electronic unit and also the battery system. In particular, the electronic unit that includes the infrared temperature sensors and a temperature measuring device may be mounted and adjusted on and/or over a battery module that includes a plurality of battery cells in a simpler manner in comparison to batteries that have conventional temperature measuring devices.

In accordance with embodiments, a structural sub-unit of a battery system is described as a battery module. A battery module includes a plurality of battery cells that are mechanically and electrically connected to one another and in most cases also include an electronic unit and/or parts of a temperature control system. A battery system generally includes a plurality of battery modules.

The field view of the sensor that is predetermined by the structure of the infrared temperature sensor determines by way of the alignment of the sensor and distance from the object to be measured an "effective measurement field" on and/or over the surface of the object to be measured, in other words for example of the battery cell of a battery system. In the case of a correspondingly small distance, this "effective measurement field" is small enough to be able to sense also partial regions of a battery cell as predetermined measurement regions. The measurement regions may be predetermined by suitably positioning and/or aligning the infrared temperature sensors on and/or over or in the electronic unit having a temperature measuring device.

In accordance with embodiments, a battery system includes at least one of: a plurality of battery cells and at least one electronic unit having a temperature measuring device. By way of sensing temperatures at selected partial regions of the plurality of battery cells, a temperature control system of the battery system may be controlled in an enhanced manner, and thus, the reliability of individual battery cells with respect to overheating is increased both during the charging process and also in the driving operation.

In accordance with embodiments, the infrared temperature sensors that are used may include optical windows or other optical components such as refractive or diffractive lenses. In particular, when the infrared temperature sensors are in suitable spatial proximity to the objects to be measured (e.g. battery cells or cell connectors) additional optical components may not be used.

In accordance with embodiments, a suitable predetermined distance between the infrared temperature sensors and the respective predetermined measurement region on the surface of the battery system is less than 50 mm, or less than 20 mm, or less than 10 mm. At a distance of less than 10 mm, depending upon the structure of the infrared temperature sensors, the diameter of the "effective measurement field" even without using additional optical components may result in the predetermined measurement region on a surface having a diameter, for example, of less than approximately 10 mm. Temperature profiles regarding a battery module may be determined by suitably evaluating a combination of predetermined measurement regions.

In accordance with embodiments, the infrared temperature sensors may be arranged thermally decoupled from the circuit board of the electronic unit having a temperature measuring device. The term "thermally decoupled" in accordance with embodiments is understood to mean that measures are taken in order to reduce the transfer of heat. To this end, by way of example, the copper cladding of the circuit board in the vicinity of the infrared temperature sensor is to a great extent removed and electrical lines (conductor tracks) are provided with as small as possible a cross-section. It is also necessary by way of milling or stamping to reveal to a great extent the region on the circuit board where the infrared temperature sensors are mounted. As a consequence, rapid temperature fluctuations of the infrared temperature sensors that are not caused by heat radiating from the objects to be measured (for example, as a result of temperature fluctuations caused by the transfer of heat from heat sources on the circuit board of the electronic unit having a temperature measuring device) are reduced or avoided.

In accordance with embodiments, the electronic unit having a temperature measuring device with infrared temperature sensors may be partially thermally decoupled from the surface of the battery cells by way of a first insulator that is arranged between the battery cells and a side of the electronic unit having a temperature measuring device, which side faces the battery cells. A first insulator (one-part or multi-part) may be configured in such a manner that regions of the circuit board of the electronic unit having a temperature measuring device are protected in the immediate vicinity of the infrared temperature sensors to prevent heat penetration. The active surface of the infrared temperature sensors remains unobscured.

In accordance with embodiments, the first insulator may include, by way of example, apertures. The apertures in the first insulator may be designed and arranged in such a manner that, on the one hand, they are as small as possible but, on the other hand, they do not impair the field of vision and also the "effective measurement field" of the infrared temperature sensors. Furthermore, the first insulator may be configured to prevent or reduce the transmission of rapid temperature fluctuations from other regions of the battery system, depending upon the installation position, in particular by way of convective heat transfer or also by way of thermal radiation, to partial regions of the temperature measuring device.

In accordance with embodiments, the electronic unit having a temperature measuring device may be thermally decoupled from other components of the battery system by way of a second insulator that is arranged on and/or over the side of the electronic unit, which side may be spatially remote from the battery. It is thus possible in particular to reduce temperature fluctuations of the environment and of the battery housing and also to reduce influences of adjacent battery modules.

The first and second insulators may also be embodied as a structural unit and in this manner encompass the entire electronic unit having a temperature measuring device or parts of the electronic unit. The first and second insulators may be thermal insulators. Suitable materials and also additional measures for thermally decoupling the infrared temperature sensors from their immediate environment are known to the person skilled in the art.

Advantageously, the battery system in accordance with embodiments includes an electronic unit having a temperature measuring device in a predetermined measurement region of the surface of a battery cell, and a predetermined breaking point of the battery cell. In the region of the predetermined breaking point the wall of the battery cell includes a thinner wall thickness as a consequence of which, in the event of a malfunction of the battery cell, the surface of the battery cell heats up more rapidly in the region of the predetermined breaking point and thus renders it possible for malfunctions to be detected at an early stage.

In accordance with embodiments, a predetermined measurement region of the surface of the battery cell is also in the proximity of a cell pole of the battery cell. When using electrode materials that are easily capable of conducting heat, in addition to current the heat that is produced in the battery cell also collects at the cell poles. This advantageously also renders it possible to detect critical operating conditions at an early stage.

In accordance with embodiments, the predetermined measurement region lies on and/or over a cell connector that is arranged between two battery cells. This arrangement advantageously renders it possible to monitor two adjacent cell poles, and thus, battery cells simultaneously using only one infrared temperature sensor.

An arrangement in which the effective measurement field of an infrared temperature sensor senses adjacent regions of the surfaces of two adjacent battery cells is advantageous and renders it possible to monitor two battery cells simultaneously using only one infrared temperature sensor.

In accordance with embodiments, the predetermined measurement region on and/or over a surface of the battery system advantageously includes a device configured to increase the coefficient of emission. If the surface of the predetermined measurement region itself does not have any good emission characteristics, (e.g., the smooth metal surface of the cell connector) then the surface may be suitably changed locally by applying a suitable layer (black matt colour, adhesive foil, etc.).

In accordance with embodiments, a battery cell includes an electronic unit having a temperature measuring device, and at least one battery cell having a window in the region of the effective measurement field of the infrared temperature sensor. As a consequence, a temperature rise inside a battery cell may be advantageously detected rapidly by way of measuring the infrared radiation.

Suitable materials for a window of this type are, for example, polypropylene and particular types of glass. Further suitable materials are known to the person skilled in the art.

In accordance with embodiments, the infrared temperature sensor is a radiation thermopile or a bolometer. Both types of sensors are particularly well suited for measuring low temperatures (−50° C. to 100° C.), they may be embodied in a compact manner and are installed on the circuit board in simple manner.

In accordance with embodiments, additional temperature sensors (infrared temperature sensors and/or other types of temperature sensors) may advantageously be arranged on and/or over the circuit board of the electronic unit having a temperature measuring device. These may be mounted both fixedly and non-movably directly on and/or over the circuit board or also connected thereto by way of flexible lines. Thus, additional temperature data may be captured, by way of example, as reference data from regions of the battery module or battery system, which data are not accessible to the infrared temperature sensors that are fixedly arranged on and/or over the circuit board.

In accordance with embodiments, a battery system includes an electronic unit having a temperature measuring device that comprises a cell monitoring unit configured to measure the voltage at the cell poles and/or cell connectors by way of voltage tapping elements. Such an electronic unit may generally house a microprocessor that is configured to monitor, and particularly, to monitor the cell voltages.

In accordance with embodiments, a battery system includes an electronic unit having a temperature measuring device that comprises a connecting plate that may be connected to a cell monitoring unit. The connecting plate houses in this case only the infrared temperature sensors and the necessary electrical lines that lead from the contacts of the infrared temperature sensors to a connector, by way of example, for an additional electronic unit that houses a microprocessor.

The operational reliability of a battery system is increased by virtue of the measures and devices that are in accordance with embodiments.

DRAWINGS

Embodiments will be illustrated by way of example in the drawings and explained in the description below FIG. 1 illustrates a side view of a battery module having an electronic unit with a temperature measuring device, in accordance with embodiments.

DESCRIPTION

Figure 1:
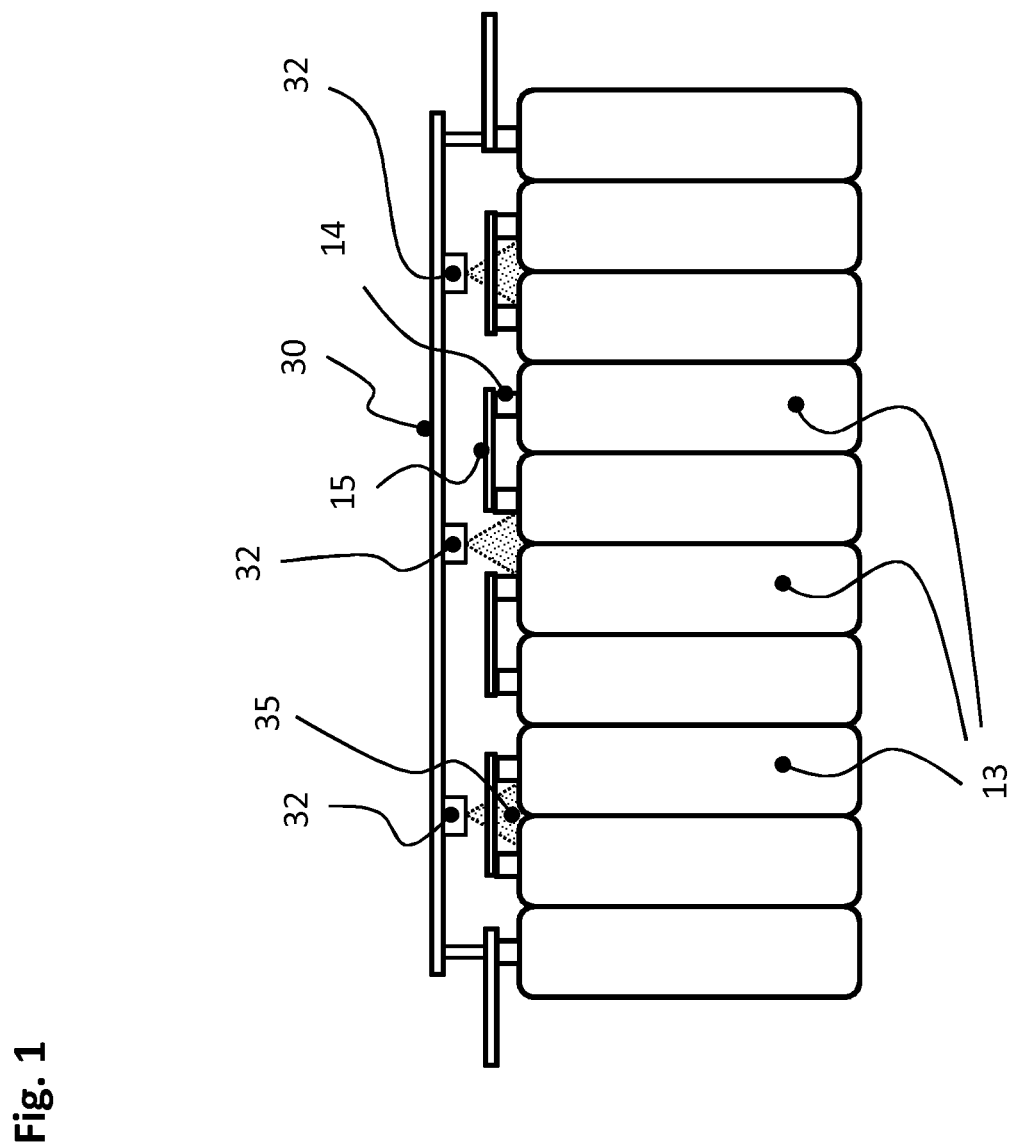

As illustrated in FIG. 1, a battery module comprises a plurality of battery cells 13. The cell poles 14 of adjacent battery cells 13 are mutually connected by way of cell connectors 15 in such a manner that a serial connection of the battery cells 13 is produced. An electronic unit 30 that is installed on and/or over a circuit board comprises a plurality of infrared temperature sensors 32 spaced apart from each other. The infrared temperature sensors 32 are configured and arranged on and/or over the circuit board of the electronic unit 30 in such a manner that an effective measurement field 35 senses or otherwise measures the temperature at predetermined partial regions of the surface of the battery cells 13. A predetermined partial region of the surface of two adjacent battery cells 13 are sensed and monitored using only one infrared temperature sensor 32. The effective measurement field 35 of the infrared temperature sensor 32 is represented in the side view schematically as a cone. The aperture angle of this field of vision is determined by virtue of the structure of the infrared temperature sensor 32 and possibly the optical devices contained therein. In the case of a particular field of vision, the effective measurement field 35 may be set by virtue of the distance between the temperature sensor and the surface to be monitored.

Figure 2:
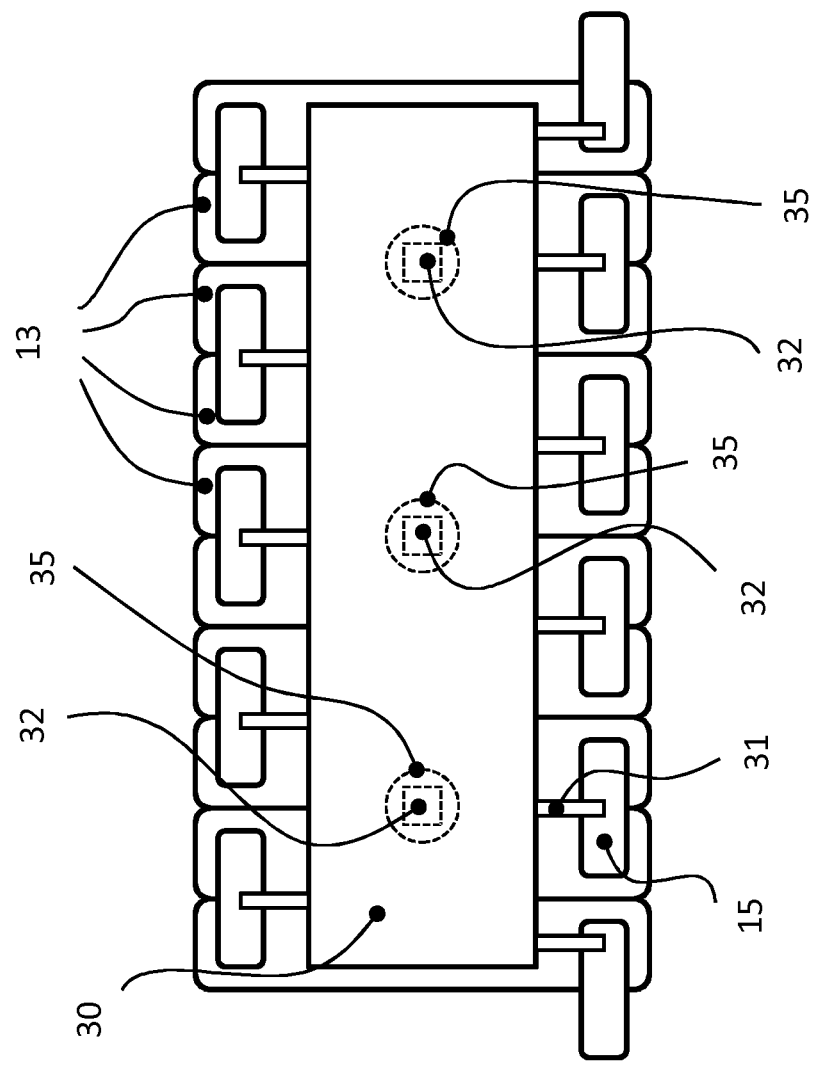
FIG. 2 illustrates a top view of the battery module of FIG. 1, in accordance with embodiments.

As illustrated in FIG. 2, the battery module of FIG. 1 includes an electronic unit 30 in accordance with embodiments with a temperature measuring device. The electronic unit 30 comprises in addition to the plurality of infrared temperature sensors 32, but other devices (not illustrated) configured to measure the voltage levels of battery cells 13. The voltage levels of the battery cells 13 may be transferred by way of the voltage tapping elements 31 from the cell connectors 15 to the electronic unit 30. The effective measurement fields of the infrared temperature sensors 32 are of a circular shape and illustrated as broken lines. Each temperature sensor is allocated a signal coordinating unit that converts the measurement signal that is received by the temperature sensor 32 into a measuring voltage or preferably into a digital measurement signal. The measurement signals that are processed by way of the signal conditioning units are transmitted for evaluation purposes to a microprocessor or microcontroller.

Figure 3:
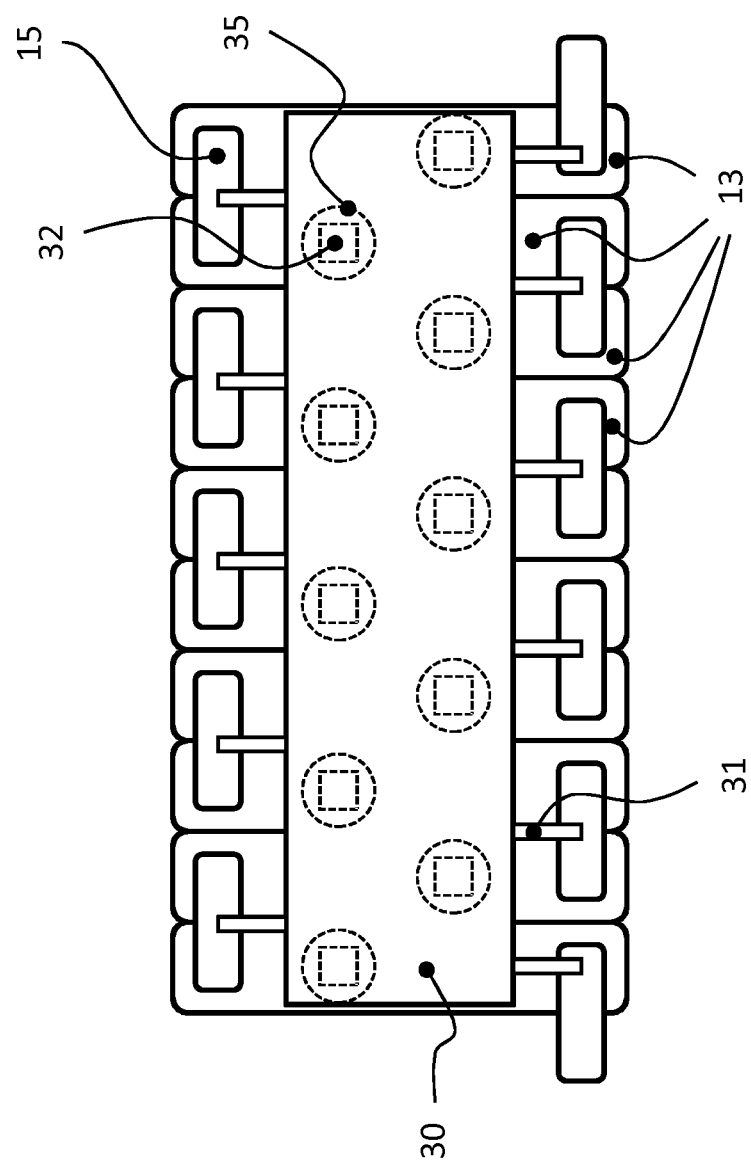
FIG. 3 illustrates a top view of an electronic unit having a temperature measuring device with an infrared temperature sensor per battery cell, in accordance with embodiments.

As illustrated in FIG. 3, an electronic unit 30 in accordance with embodiments has a temperature measuring device. The electronic unit 30 includes for each battery cell 13 a separate infrared temperature sensor 32 that is allocated thereto.

Figure 4:
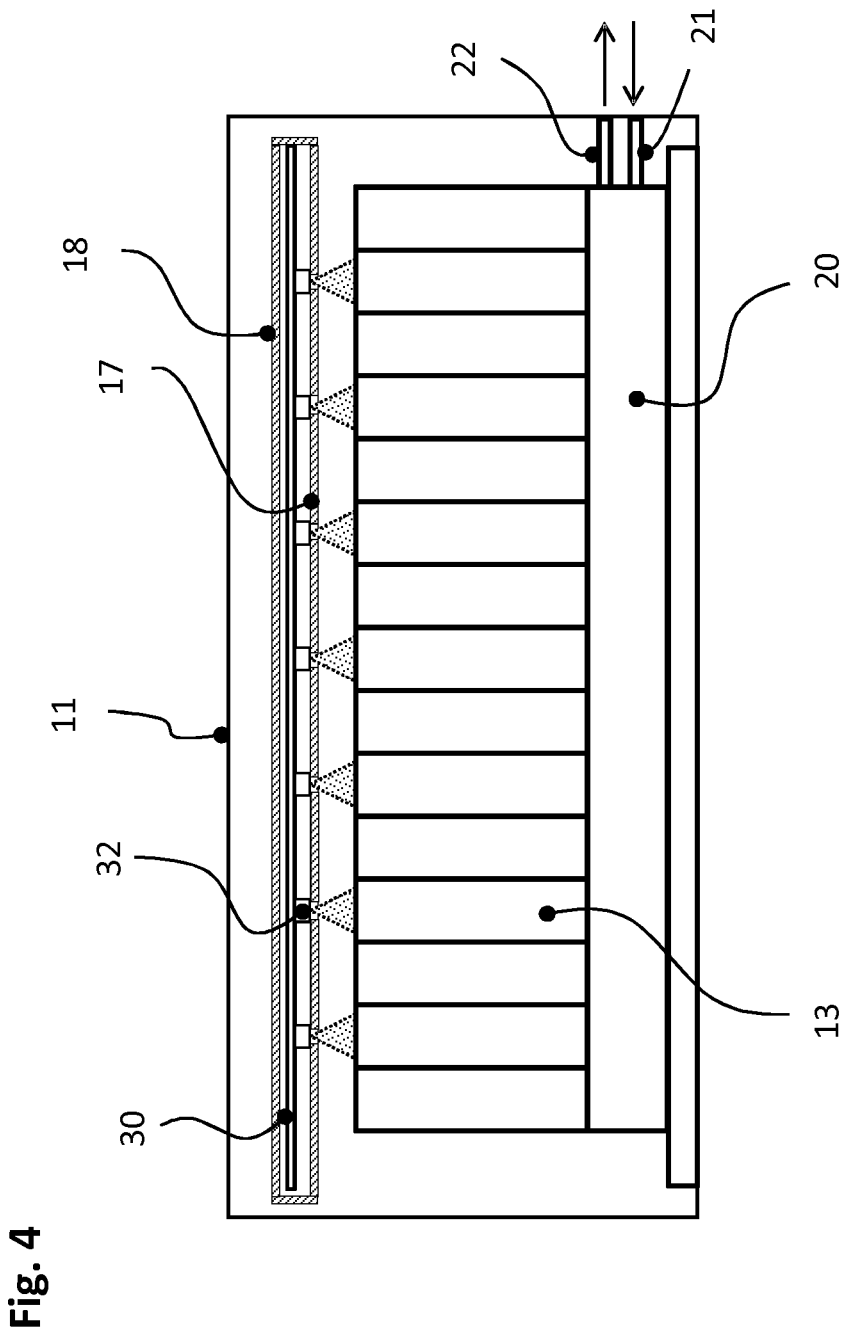
FIG. 4 illustrates a battery system having a plurality of infrared temperature sensors and an insulated electronic unit with a temperature measuring device, in accordance with embodiments.

As illustrated in FIG. 4, a battery system has a battery housing 11 with an arrangement configured to control the temperature of the battery cells 13. Temperature control media may be supplied to a temperature control system 20 by way of an inlet aperture 21 and returned by way of an outlet aperture 22 to an external circuit for cooling/warming. As a consequence, the battery cells 13 are protected both from overheating and also from over-cooling. The temperature control system 20 is configured to generate an optimum temperature range for operating the battery cells 13 in accordance with the measurement data of the (infrared) temperature sensors 32.

The electronic unit 30 together with the infrared temperature sensors 32 is protected by way of a first insulator 17 and a second insulator 18 against thermal influences from other regions of the battery system. The first insulator 17 includes, in the region of infrared temperature sensors 32, small apertures that are configured in such a manner that they do not impair the field of vision, and thus, the effective measurement field 35 of the infrared temperature sensors 32.

Microprocessors or microcontrollers may be arranged directly on and/or over the electronic units 30, or may also be connected to higher-ranking electronic devices, by way of, for example, to a battery monitoring unit (BMU) by way of analogue and/or digital lines, in particular, serial bus systems.

Figure 5:
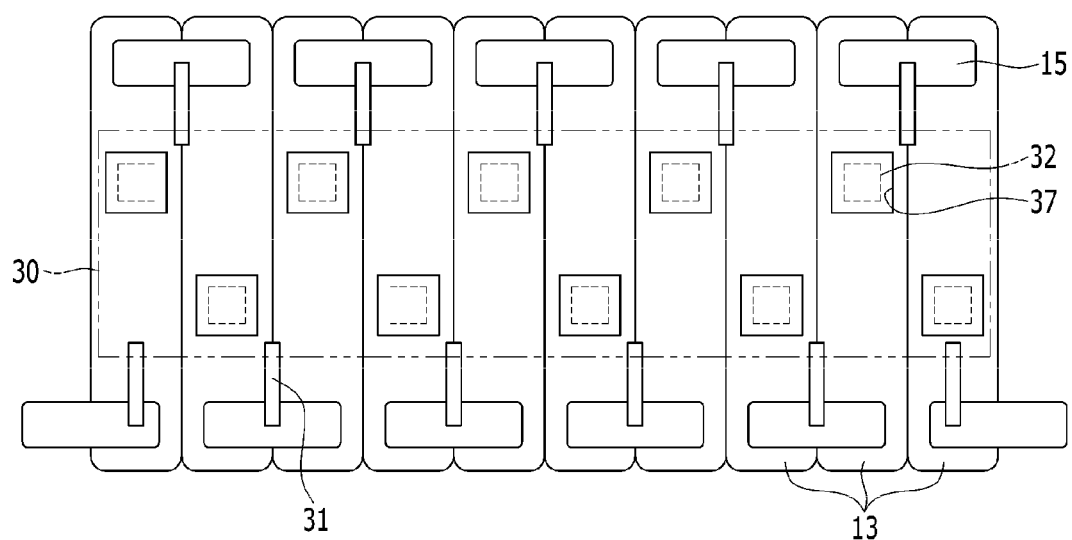
FIG. 5 illustrates a top view of a battery module having a temperature measuring device with an infrared temperature sensor arranged per battery cell in phantom, and each of the battery cells having a window therein, in accordance with embodiments.

As illustrated in FIG. 5, each of the battery cells 13 includes an optical window 37 in the region of the effective measurement field of respective ones of the infrared temperature sensors 32. In FIG. 5, the electronic unit 30 and the infrared temperature sensors 32 are illustrated in phantom so the optical windows 37 of the battery cells 13 are visible.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

11 Battery Housing
13 Battery Cell
14 Cell Pole
15 Cell Connector
17 First (thermal) Insulator
18 Second (thermal) Insulator
20 Temperature Control System
21 Inlet Aperture
22 Outlet Aperture
30 Electronic Unit having a Temperature Measuring Device
31 Voltage Tapping Element
32 Infrared Temperature Sensor
35 Effective Measurement Field/Field of Vision

What is claimed is:

1. A battery system comprising:
a plurality of battery cells;
an electronic unit comprising a circuit board and a temperature measuring device, the temperature measuring device comprising a plurality of infrared temperature sensors arranged on and operatively connected to the circuit board and configured to measure a temperature of a predetermined measurement region on a surface of the battery cells; and
a first insulator arranged between the battery cells and a side of the electronic unit, which side faces the battery cells, the first insulator comprising apertures in a region of the infrared temperature sensors and configured to partially thermally decouple the infrared temperature sensors from the battery cells.

2. The battery system of claim 1, wherein the infrared temperature sensors are thermally decoupled from the circuit board.

3. The battery system of claim 1, further comprising a second insulator arranged on another side of the electronic unit, which side is remote from the battery cells, the second insulator configured to thermally decouple the electronic unit from other components of the battery system.

4. The battery system of claim 1, wherein the predetermined measurement region of the surface of the battery cells comprises a predetermined breaking point of the battery cells.

5. The battery system of claim 1, wherein the predetermined measurement region of the surface of the battery cells lies in proximity of a cell pole of the battery cells.

6. The battery system of claim 1, wherein the predetermined measurement region lies on a cell connector arranged between two battery cells.

7. The battery system of claim 1, wherein the predetermined measurement region includes a device configured to increase a coefficient of emission.

8. The battery system of claim 1, wherein at least one of the battery cells comprises a window in a region of an effective measurement field of the infrared temperature sensors.

9. The battery system of claim 1, wherein the infrared temperature sensors comprise a radiation thermopile or a bolometer.

10. The battery system of claim 1, wherein additional temperature sensors are arranged on the circuit board of the electronic unit.

11. The battery system of claim 1, wherein the electronic unit further comprises a cell monitoring unit configured to measure a voltage at cell poles and/or cell connectors by way of voltage tapping elements.

12. A battery system comprising:
a plurality of battery cells;
an electronic unit comprising a circuit board and a temperature measuring device, the temperature measuring device comprising a plurality of infrared temperature sensors arranged on and operatively connected to the circuit board and configured to measure a temperature of a predetermined measurement region on a surface of the battery cells; and
an insulator arranged between the battery cells and a side of the electronic unit, which side faces the battery cells, the insulator being configured to partially thermally decouple the infrared temperature sensors from the battery cells,
wherein an effective measurement field of the infrared temperature sensor simultaneously senses adjacent battery cells.

13. A battery system for a motor vehicle comprising:
a plurality of battery cells;
an electronic unit comprising a circuit board;
a temperature sensor operatively connected to the circuit board and configured to measure a temperature of a predetermined measurement region on a surface of the battery cells; and
a first insulator arranged between the battery cells and a side of the electronic unit, which side faces the battery cells, the first insulator being configured to partially thermally decouple the temperature sensor from the battery cells,
wherein the temperature sensor has an effective measurement field that simultaneously measures the temperature of adjacent battery cells.

14. The battery system of claim 13, wherein the temperature sensor comprises an infrared temperature sensor.

15. The battery system of claim 13, wherein the temperature sensor is thermally decoupled from the circuit board.

16. The battery system of claim 13, further comprising:
a second insulator arranged on another side of the electronic unit, which side is remote from the battery cells, the second insulator being configured to thermally decouple the electronic unit from other components of the battery system.

17. The battery system of claim 16, wherein the first insulator comprises apertures in a region of the temperature sensor.

18. The battery system of claim 13, wherein the electronic unit comprises a cell monitoring unit configured to measure a voltage at cell poles and/or cell connectors by way of voltage tapping elements.

* * * * *